United States Patent
Kwon et al.

(10) Patent No.: US 12,002,346 B2
(45) Date of Patent: Jun. 4, 2024

(54) DISPLAY DEVICE INCLUDING DISPLAY AND ROLLER TO WIND OR UNWIND DISPLAY

(71) Applicant: LG ELECTRONICS INC., Seoul (KR)

(72) Inventors: Jeonghwan Kwon, Seoul (KR); Donghee Han, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/758,569

(22) PCT Filed: Jan. 9, 2020

(86) PCT No.: PCT/KR2020/000379
§ 371 (c)(1),
(2) Date: Jul. 8, 2022

(87) PCT Pub. No.: WO2021/141161
PCT Pub. Date: Jul. 15, 2021

(65) Prior Publication Data
US 2023/0036884 A1    Feb. 2, 2023

(51) Int. Cl.
*G08B 5/22* (2006.01)
(52) U.S. Cl.
CPC .................................. *G08B 5/22* (2013.01)
(58) Field of Classification Search
CPC ...... G08B 5/22; G09F 9/301; G09G 2354/00; G09G 2380/02; G09G 3/035; H04N 21/43615; H04N 21/43637; H04N 21/47214; H04N 21/4858
See application file for complete search history.

(56) References Cited

U.S. PATENT DOCUMENTS

| | | | |
|---|---|---|---|
| 2009/0051830 A1* | 2/2009 | Matsushita | G06F 3/1423 361/679.05 |
| 2009/0168608 A1* | 7/2009 | Lan | G04G 15/003 368/10 |
| 2017/0103735 A1* | 4/2017 | Oh | G09G 5/006 |
| 2017/0290935 A1* | 10/2017 | Boodaghians | A47L 9/02 |
| 2018/0348881 A1* | 12/2018 | Chung | H04W 88/02 |
| 2019/0295403 A1 | 9/2019 | Lin et al. | |

FOREIGN PATENT DOCUMENTS

| | | |
|---|---|---|
| KR | 1020160123620 | 10/2016 |
| KR | 1020170014886 | 2/2017 |
| KR | 1020170105111 | 9/2017 |
| KR | 1020190022157 | 3/2019 |

OTHER PUBLICATIONS

PCT International Application No. PCT/KR2020/000379, International Search Report dated Sep. 21, 2021, 2 pages.

* cited by examiner

*Primary Examiner* — Omer S Khan
(74) *Attorney, Agent, or Firm* — LEE, HONG, DEGERMAN, KANG & WAIMEY

(57) ABSTRACT

Provided is a display device in which a display completes preparation for outputting an alarm before an alarm output time. The display device comprises a housing, a display, a roller accommodated in the housing to rotate to wind or unwind the display, and a controller configured to control the roller such that the display is drawn out of the housing before a predetermined time of a set alarm time and to output an alarm at the alarm time.

20 Claims, 17 Drawing Sheets

FIG. 11
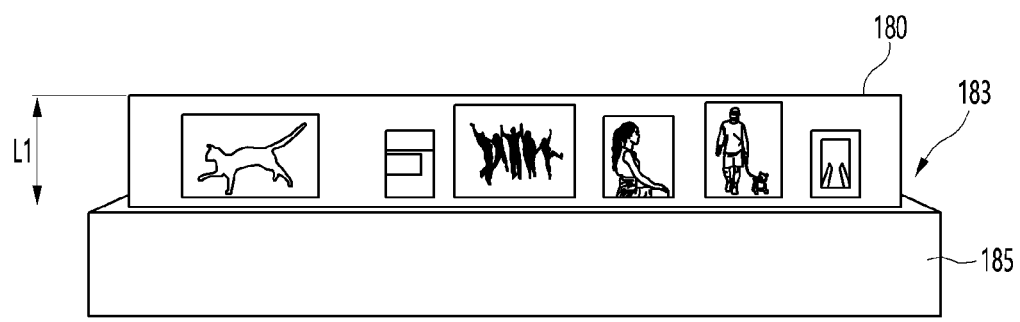
(a)
(b)

FIG. 12
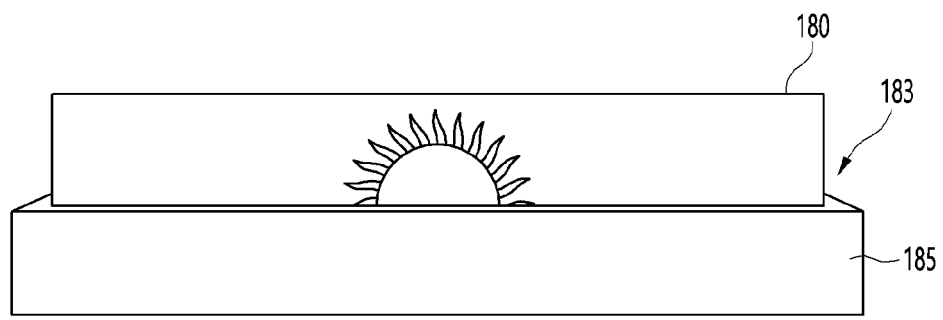
(a)
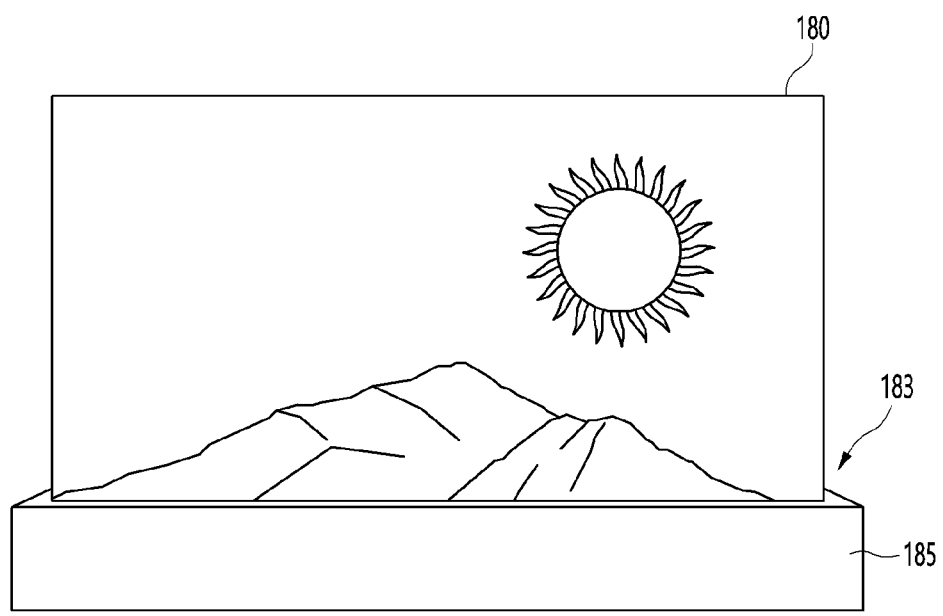
(b)

FIG. 13
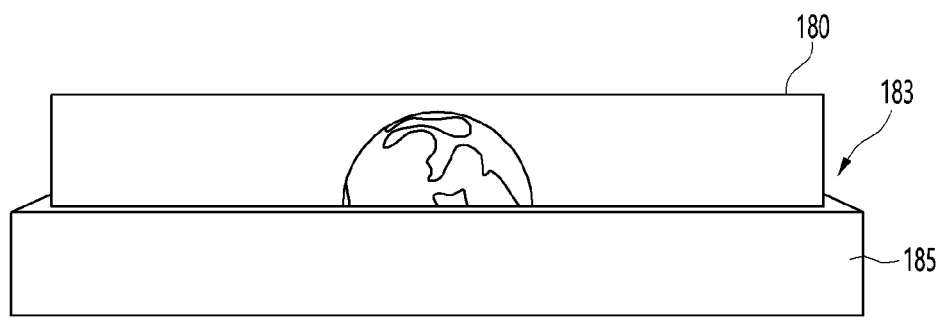
(a)
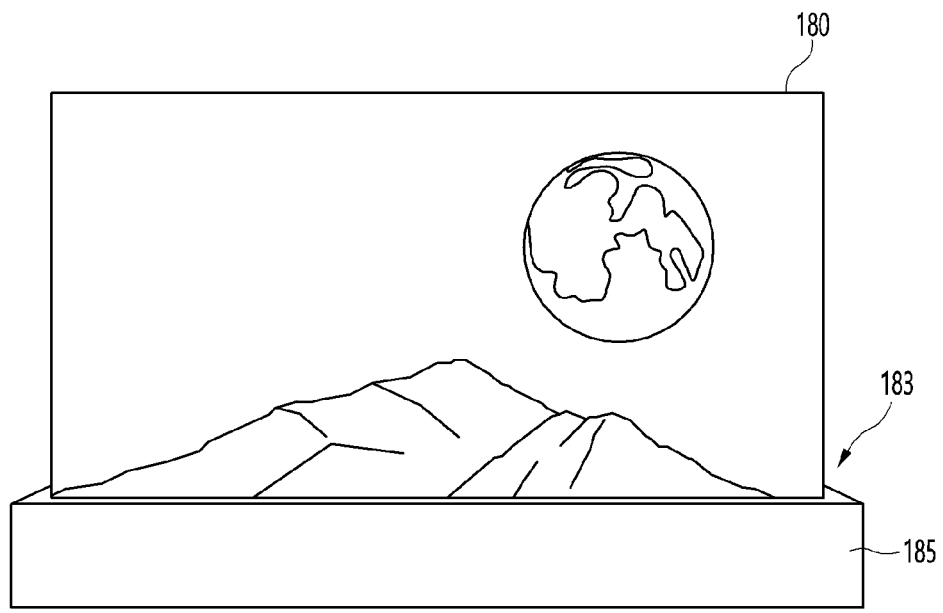
(b)

FIG. 16
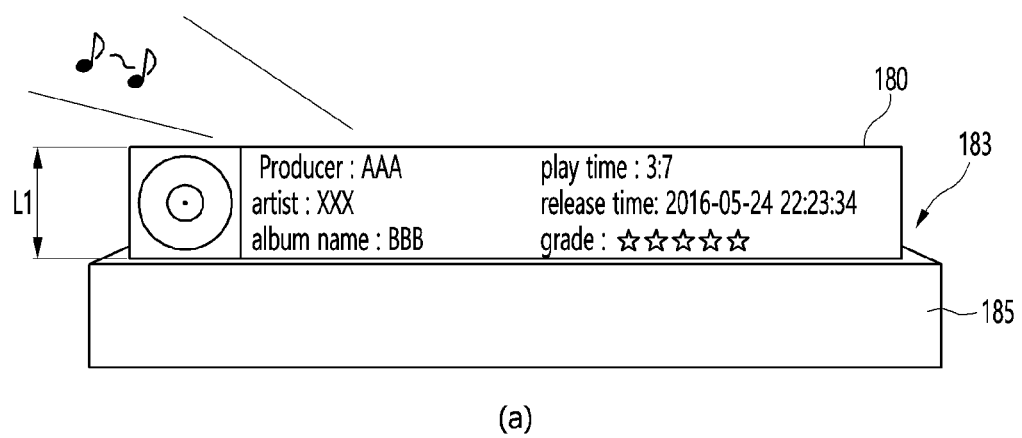
(a)
(b)

FIG. 17
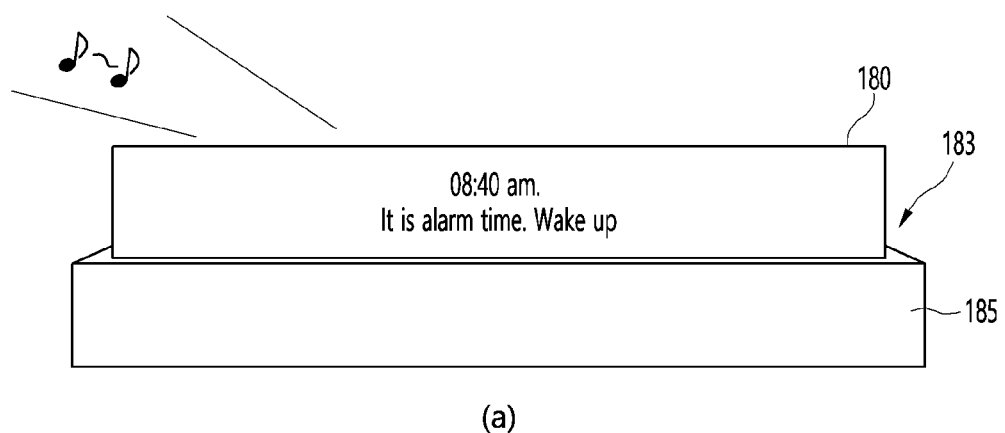
(a)
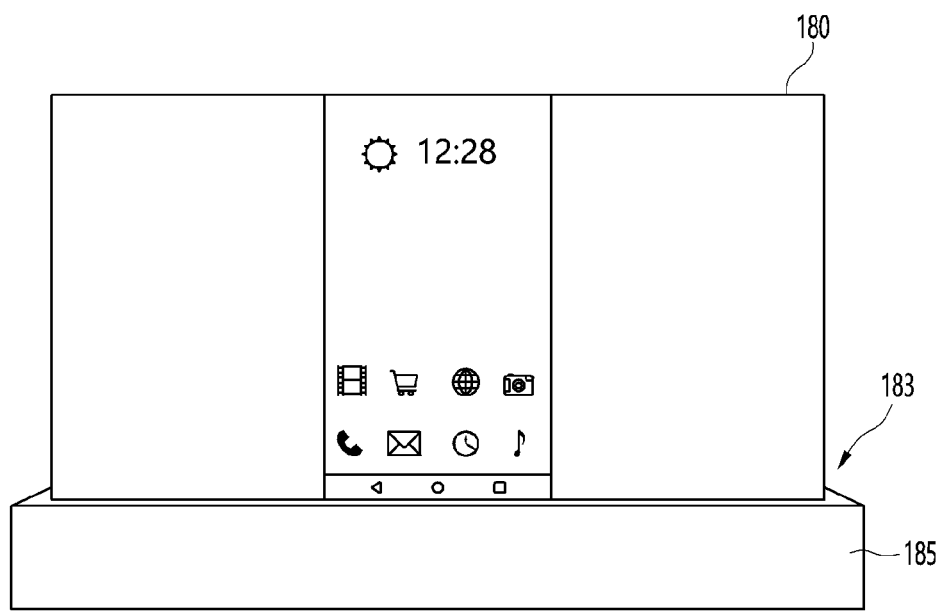
(b)

FIG. 18
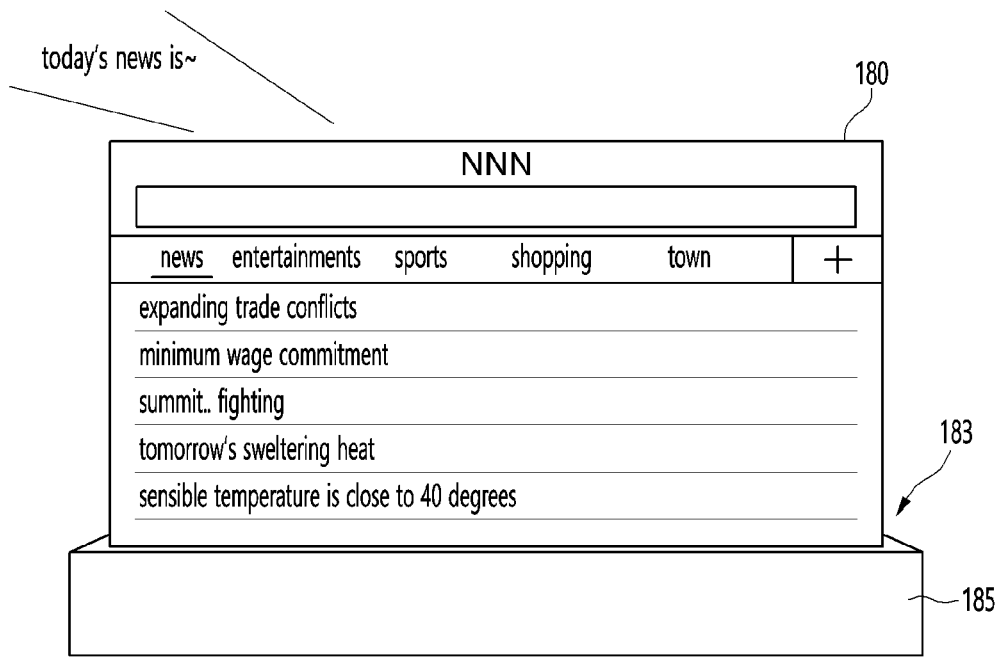
(a)
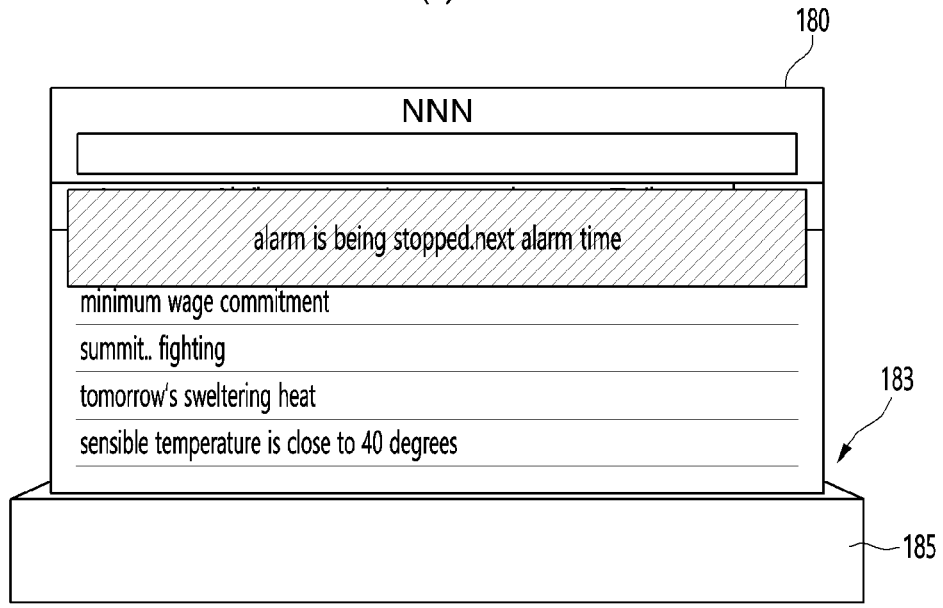
(b)

DISPLAY DEVICE INCLUDING DISPLAY AND ROLLER TO WIND OR UNWIND DISPLAY

CROSS-REFERENCE TO RELATED APPLICATION(S)

This application is the National Stage filing under 35 U.S.C. 371 of International Application No. PCT/KR2020/000379, filed on Jan. 9, 2020, the contents of which are all incorporated by reference herein in its entirety.

TECHNICAL FIELD

The present disclosure relates to a display device, and more particularly, to a display device having a flexible display.

BACKGROUND ART

A display device has a function of receiving, processing, and displaying an image to be viewed by a user. For example, the display device receives a broadcast signal selected by a user among broadcast signals transmitted from a broadcasting station, separates an image signal from the received signal, and re-displays the separated image signal on a display.

Recently, by virtue of development of broadcasting technology and network technology, a function of a display device has been significantly diversified and accordingly the performance of the device has also been enhanced. That is, the display device has developed to provide various different contents as well as simply broadcast content to a user. For example, the display device can provide gameplay, listening to music, Internet shopping, user customized information, or the like using various applications as well as programs received from a broadcasting station. In order to perform such extended functions, the display device is basically connected to other devices or networks using various communication programs and provides a ubiquitous computing environment to a user. That is, the display device has evolved to a smart device for achieving connectivity to a network and ubiquitous computing.

In addition, displays which can be significantly deformed with sufficient elasticity have been developed. Such a flexible display is deformable enough to be rolled into a main body of the display apparatus.

The display apparatus may include a flexible display as described above in which an area protruding to the outside of the display is changed by being rolled or unrolled in a direction guided by a roller. By using such a rollable display, the display apparatus may have a more compact structure.

Accordingly, the entire display area may be exposed to the outside to display the content or only a part of the display area may be exposed to display the content in only a partial area. In addition, the display device may perform only a function as a speaker by drawn the entire display area into the housing.

Such a display device may provide an alarm to a user. The alarm may mean a function to notify the user that a set time has come. For example, when a set time comes, the display device may provide an alarm by displaying alarm content on the display or outputting an alarm sound through a speaker.

On the other hand, when the display is a rollable display, there may be a problem that alarm content cannot be displayed on the display at the alarm time due to a time required to draw out the display.

INVENTION

Technical Problem

An object of the present disclosure is to provide a display apparatus completes preparation for outputting an alarm before an alarm output time.

An object of the present disclosure is to provide a display apparatus outputs an alarm utilizing a feature from the display is drawn out.

An object of the present disclosure is to provide a display apparatus capable of controlling an alarm by interacting with an external device.

Technical Solution

The display apparatus according to the embodiment of the present disclosure may comprise a housing, a display, a roller accommodated in the housing to rotate to wind or unwind the display and a controller configured to control the roller such that the display is drawn out of the housing before a predetermined time of a set alarm time and to output an alarm at the alarm time.

The controller may differently adjust a draw-out length of the display according to alarm setting information.

The controller may control the roller such that the display is drawn out of the housing by a preset length.

The preset length may vary according to a type of an application which is set to be displayed on the display when the alarm is output.

The controller may differently output the alarm according to a draw-out length of the display when the alarm is output.

The controller may draw out the display by a maximum length when a user is detected while the alarm is output.

The controller displays, on the display, a mirroring screen of an external device interworking with the display device when a user is detected while the alarm is output.

The controller may output sound or an image received through an external device interworking with the display device when the alarm is output.

The controller may control the display such that a preset image is displayed on the display while the display is drawn out.

The preset image may vary according to the set alarm time.

The controller may perform control to gradually increase brightness of the display while the display is drawn out.

The controller may control the display such that brightness of the display varies according to a current time.

The controller sets the alarm to be output again after a reference time, when an input signal for temporarily stopping the alarm is received.

The controller may turn off power of the display device when the number of times of receiving the input signal for temporarily stopping the alarm exceeds a preset number of times.

The controller may adjust brightness of the display when an input signal for temporarily stopping the alarm is received.

The controller may adjust the brightness of the display after the input signal for temporarily stopping the alarm is received to be darker than the brightness of the display before the input signal for temporarily stopping the alarm is received.

The controller may transmit, to an external device, a signal for granting authority to remotely control the display device when the alarm is output at the alarm time.

The controller may end the alarm when there is no input signal during a predetermined time from an output time of the alarm.

The controller may control the roller to draw the display into the housing when there is no input signal during a preset time from the set alarm time.

The controller may set the alarm as the alarm is set based on a signal received from an external device or user input is received.

Effect of the Invention

According to an embodiment of the present disclosure, since a display device draws out a display in advance, there is an advantage that alarm content can be displayed at an alarm time.

According to an embodiment of the present disclosure, an emotional alarm effect can be given to a user by utilizing a time required to draw out the display, and an alarm can be output at a sunrise time or the like even when a user directly sets an alarm time, thereby increasing availability of the alarm.

According to an embodiment of the present disclosure, there is an advantage that alarm information that can be provided according to the mode of the display can be provided to the user to the maximum.

According to an embodiment of the present disclosure, there is an effect of reducing unnecessary power consumption by dimming the brightness of the display while the alarm is temporally stopped.

According to an embodiment of the present disclosure, there is an advantage that an alarm output from the display device can be more easily controlled through an external device.

DESCRIPTION OF DRAWINGS

FIG. 11 is a diagram illustrating a method for the display device to adjust a draw-out length of a display according to a set application according to an embodiment of the present disclosure.

FIGS. 12 and 13 are views illustrating a method for a display device to display a preset image while a display is drawn out according to an embodiment of the present disclosure.

FIG. 16 is a diagram illustrating an example of an operation method when a user is detected while a display device outputs an alarm according to an embodiment of the present disclosure.

FIG. 17 is a diagram illustrating another example of an operation method when a user is detected while a display device outputs an alarm according to an embodiment of the present disclosure.

FIG. 18 is a diagram illustrating a method of operating the display device when the display device receives an input signal for temporarily stopping an alarm.

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves. In addition, in describing the embodiments disclosed herein, when it is determined that the detailed description of the related known technology may obscure the gist of the embodiments disclosed herein, the detailed description thereof will be omitted. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. can be used herein to describe various elements, these elements should not be limited by these terms. These terms are generally only used to distinguish one element from another.

When an element is referred to as being "connected with" another element, the element can be connected with the other element or intervening elements can also be present. In contrast, when an element is referred to as being "directly connected with" another element, there are no intervening elements present. A singular representation can include a plural representation unless it represents a definitely different meaning from the context.

A singular representation can include a plural representation unless it represents a definitely different meaning from the context.

It will be further understood that the terms "comprises," "comprising," "having," "having," "includes," "including" and/or variations thereof, when used in this specification, specify the presence of stated features, integers, steps, operations, elements, and/or components, but do not preclude the presence or addition of one or more other features, integers, steps, operations, elements, components, and/or groups thereof.

The display device described in this specification refers to a TV, a smart TV, a network TV, a hybrid broadcast broadband television (HBBTV), an Internet TV, a web TV, an Internet protocol television (IPTV), digital signage, a desktop computer, a smartphone, a laptop computer, a digital broadcast terminal, a personal digital assistant (PDA), a portable multimedia player (PMP), a navigation system, a slate PC, a tablet PC, an ultrabook, a wearable device, etc. Including a rollable display. Here, rollable display means that a display can be rolled in the form of a roll and can include a flexible display, a foldable display, etc.

Figure 1:
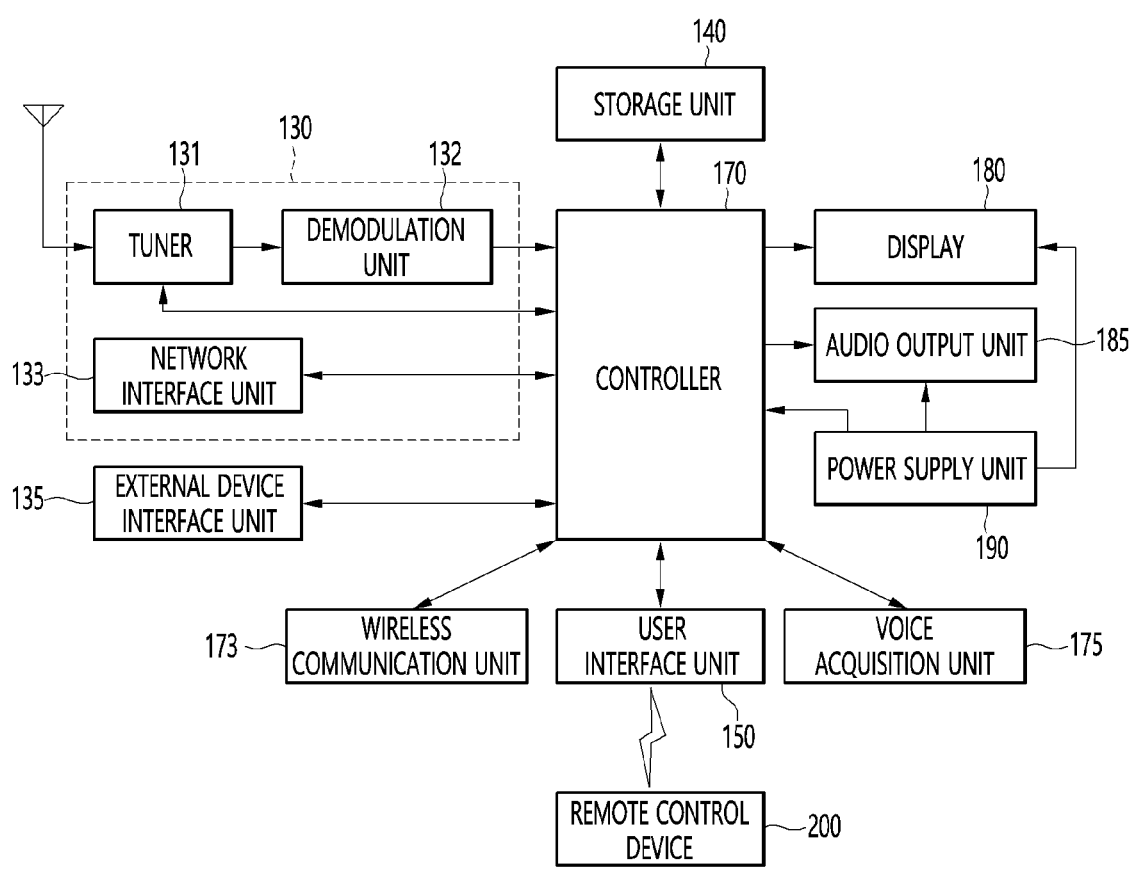
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 includes a broadcast reception unit 130, an external device interface unit 135, a storage 140, a user input interface unit 150, a controller 170, a wireless communication unit 173, a voice acquisition unit 175, a display 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 may receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The network interface unit 133 provides an interface for connecting the display device 100 to a wired/wireless network including internet network. The network interface unit 133 can transmit or receive data to or from another user or another electronic device through an accessed network or another network linked to the accessed network.

Additionally, some content data stored in the display apparatus 100 can be transmitted to a user or an electronic device, which is selected from other users or other electronic devices pre-registered in the display apparatus 100.

The network interface unit 133 can access a predetermined webpage through an accessed network or another network linked to the accessed network. That is, it may transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can also select and receive a desired application among applications open to the air, through network.

The external device interface unit 135 can receive an application or an application list in an adjacent external device and deliver it to the controller 170 or the storage 140.

The external device interface 135 can also provide a connection path between the display device 100 and an external device. The external device interface 135 can receive at least one of image and audio output from an external device that is wirelessly or wiredly connected to the display device 100 and deliver it to the controller. An external device connectable to the external device interface unit 130 may be one of a set-top box, a Blu-ray player, a DVD player, a game console, a sound bar, a smartphone, a PC, a USB Memory, and a home theater system but this is just exemplary.

The storage 140 can store signal-processed image, voice, or data signals stored by a program in order for each signal processing and control in the controller 170.

Additionally, the storage 140 can perform a function for temporarily store image, voice, or data signals output from the external device interface unit 135 or the network interface unit 133 and can store information on a predetermined image through a channel memory function.

The storage 140 can also store an application or an application list input from the external device interface unit 135 or the network interface unit 133.

The display device 100 can play content files (for example, video files, still image files, music files, document files, application files, and so on) stored in the storage 140 and provide them to a user.

The user input interface unit 150 can deliver signals input from a user to the controller 170 or deliver signals from the controller 170 to a user. For example, the user input interface unit 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface unit 150 can deliver, to the controller 170, control signals input from local keys (not shown) such as a power key, a channel key, a volume key, and a setting key.

Image signals that are image-processed in the controller 170 can be input to the display 180 and displayed as an image corresponding to corresponding image signals. Additionally, image signals that are image-processed in the controller 170 can be input to an external output device through the external device interface unit 135.

Voice signals processed in the controller 170 can be output to the audio output unit 185. Additionally, voice signals processed in the controller 170 can be input to an external output device through the external device interface unit 135.

Besides that, the control module 170 can control overall operations in the display device 100.

Additionally, the controller 170 can control the display device 100 by a user command or internal program input through the user input interface unit 150 and download a desired application or application list into the display device 100 in access to network.

The control unit 170 may output channel information selected by a user together with processed image or voice signals through the display 180 or the audio output unit 185.

Additionally, according to an external device image playback command received through the user input interface unit 150, the controller 170 can output image signals or voice signals of an external device such as a camera or a camcorder, which are input through the external device interface unit 135, through the display 180 or the audio output unit 185.

Further, the controller 170 can control the display 180 to display images and control broadcast images input through the tuner 131, external input images input through the external device interface unit 135, images input through the network interface unit, or images stored in the storage 140 to be displayed on the display 180. In this instance, an image displayed on the display 180 can be a still image or video and also can be a 2D image or a 3D image.

Additionally, the controller 170 can play content stored in the display device 100, received broadcast content, and external input content input from the outside, and the content can be in various formats such as broadcast images, external input images, audio files, still images, accessed web screens, and document files. Further, the wireless communication unit 173 can perform a wired or wireless communication with an external electronic device.

The communication unit 173 may communicate with an external device through wired or wireless communication. The communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The communication unit 173 can support wireless communication between the display device 100 and a wireless communication system, between the display device 100 and another display device 100, or between networks including the display device 100 and another display device 100 (or an external server) through wireless area networks. The local area networks may be wireless personal area networks).

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication unit 173. Accordingly, a user of the wearable device can use the data processed in the display device 100 through the wearable device.

Meanwhile, in some embodiments, the display device 100 may further include at least one of a motion recognition sensor 175 or a light emission unit 177. The motion recognition sensor 175 or the light emission unit 177 may be provided in the housing 185, but this is merely an example, and the position of the motion recognition sensor 175 and the position of the light emission unit 177 are not limited.

The motion recognition sensor 175 may detect user motion. The motion recognition sensor 175 may detect motion occurring around the display device 100.

According to a first embodiment, the motion recognition sensor 175 may include a radar. The radar may detect motion by emitting electromagnetic waves and then receiving the reflected electromagnetic waves. The radar may detect whether motion occurs around the display device 100.

According to a second embodiment, the motion recognition sensor 175 may include a camera. The camera may capture an image around the display device 100 and the controller 170 may analyze the captured image, thereby detecting motion.

Meanwhile, the above-described embodiments are merely examples for convenience of description, and the motion recognition sensor 175 may detect motion in various ways through various configurations. In addition, the above-described first embodiment and second embodiment may be implemented separately or may be implemented in combination.

The light emission unit 177 may emit a predetermined light to the outside. For example, the light emission unit 177 may be an LED bar including at least one LED.

The display 180 can convert image signals, data signals, or OSD signals, which are processed in the controller 170, or images signals or data signals, which are received in the external device interface unit 135, into R, G, and B signals to generate driving signals.

The display 180 may be a rollable display.

Figure 5:
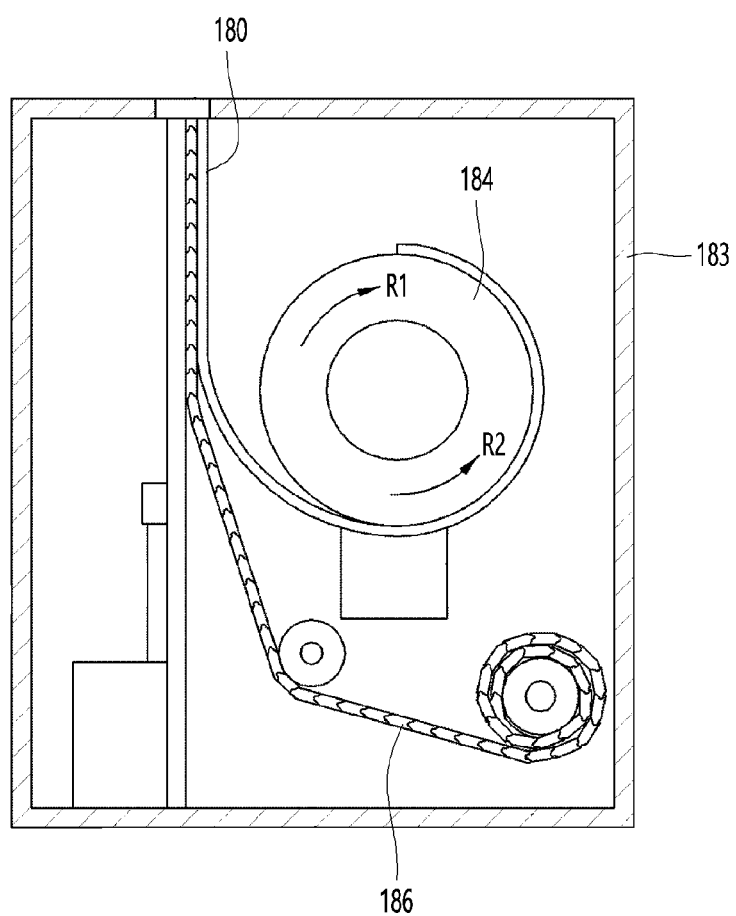
FIG. 5 is a cross-sectional view illustrating the inside of the housing of a display device according to an embodiment of the present disclosure.

The rollable display may refer to a display which may be drawn into the housing 183 (see FIG. 5) and wound around a roller 184 (see FIG. 5), or drawn out of the housing 183 (see FIG. 5) and unwound from the roller (184, see FIG. 5).

The display device 100 may include a rollable display, and an area in which content is displayed may be increased or decreased as the rollable display is drawn out or in.

Hereinafter, the display 180 may mean a rollable display.

Furthermore, the display device 100 shown in FIG. 1 is just one embodiment of the present disclosure and thus, some of the components shown can be integrated, added, or omitted according to the specification of the actually implemented display device 100.

That is, if needed, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this instance, an operating method of a display device according to an embodiment of the present disclosure described below can be performed by one of the display device described with reference to FIG. 1, an image processing device such as the separated set-top box, and a content playback device including the display 180 and the audio output unit 185. The audio output unit 185 receives the audio processed signal from the controller 170 and outputs the sound.

Figure 2:
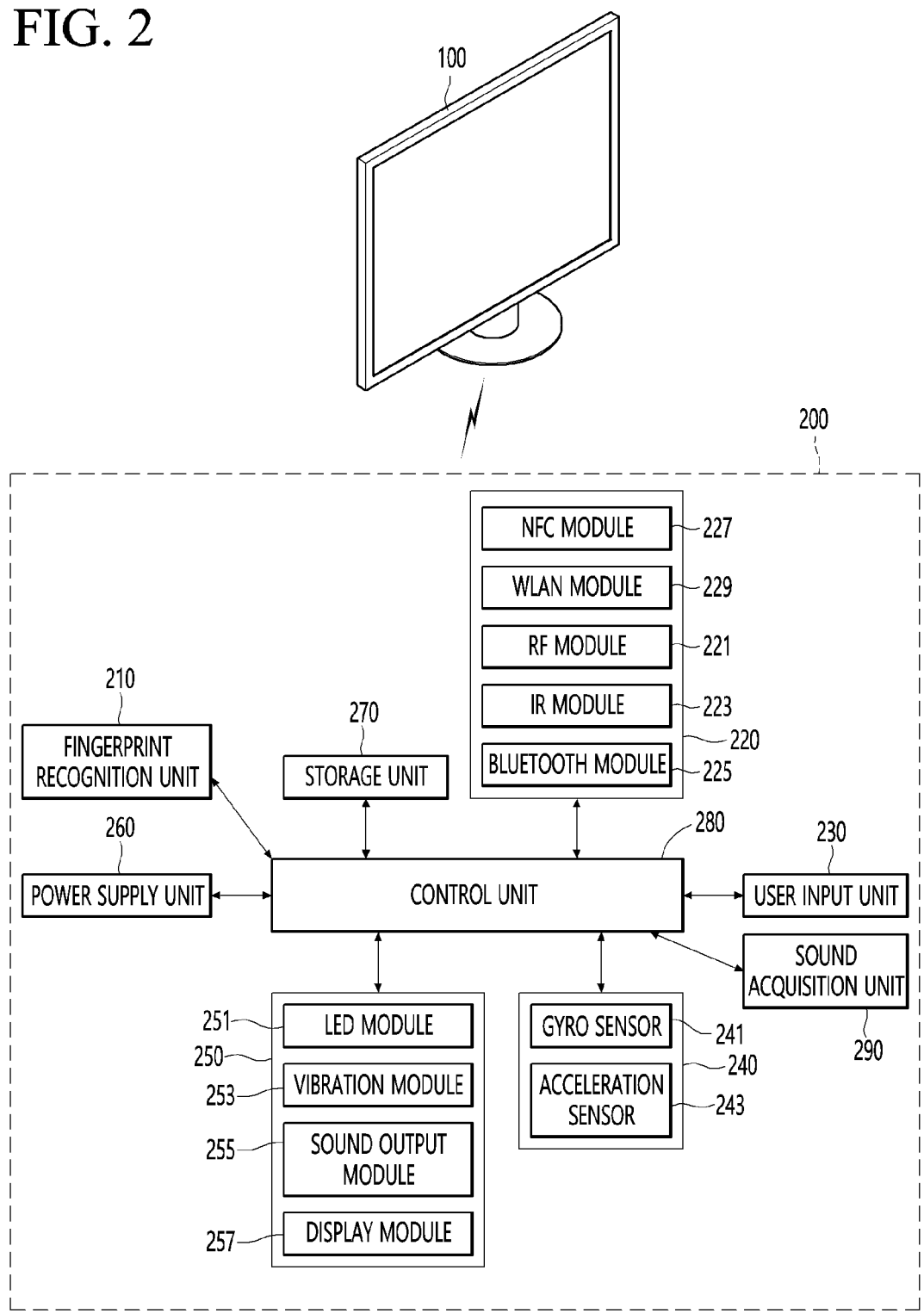
FIG. 2 is a block diagram illustrating a remote control device according to an embodiment of the present disclosure.
Figure 3:
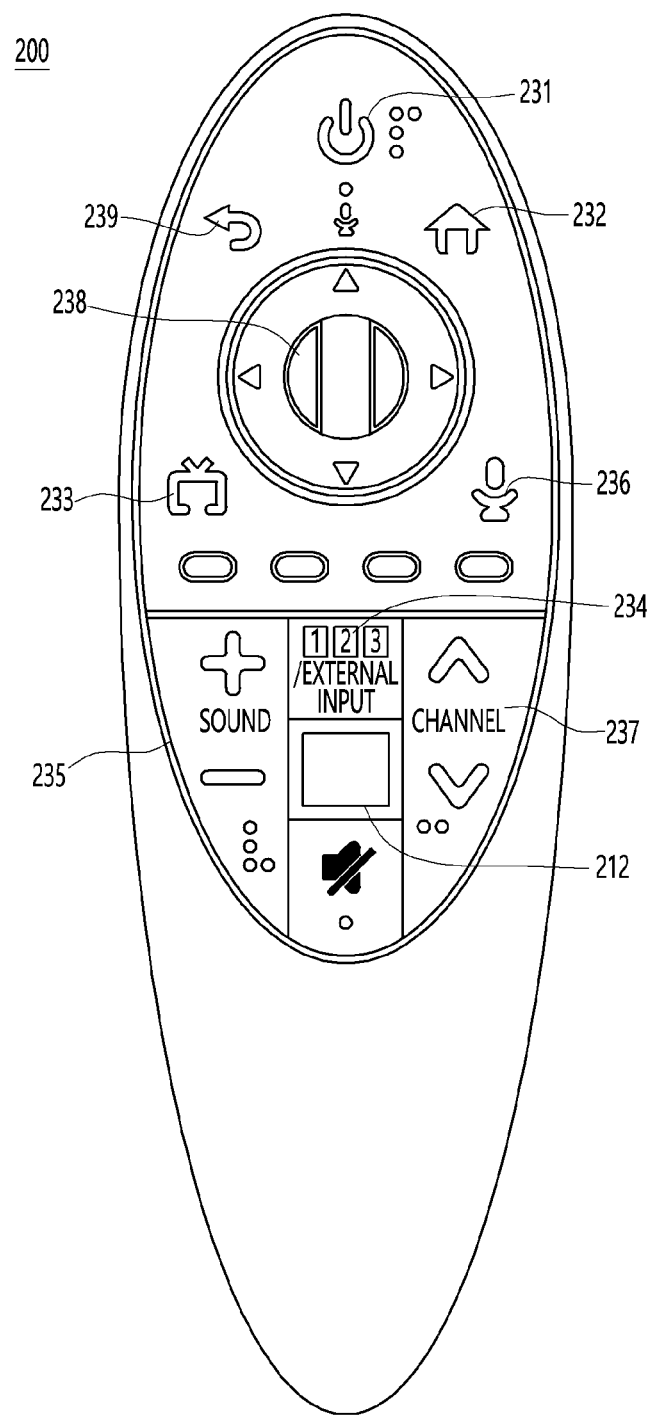
FIG. 3 is a view illustrating an actual configuration of a remote control device according to an embodiment of the present disclosure.

Next, referring to FIGS. 2 and 3, a remote control device is described according to an embodiment of the present disclosure.

FIG. 2 is a block diagram illustrating a remote control device according to an embodiment of the present disclosure, and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 2, the wireless communication unit 225 transmits/receives signals to/from an arbitrary any one of display devices according to the above-mentioned embodiments of the present disclosure.

The remote control device 200 may include an RF module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Further, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. Thus, a user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be a button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving a user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input mechanisms manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 based on x, y, and z axes and the acceleration sensor 243 can sense information on a movement speed of the remote control device 200. Further, the remote control device 200 can further include a distance measurement sensor and sense a distance with respect to the display 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage unit 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
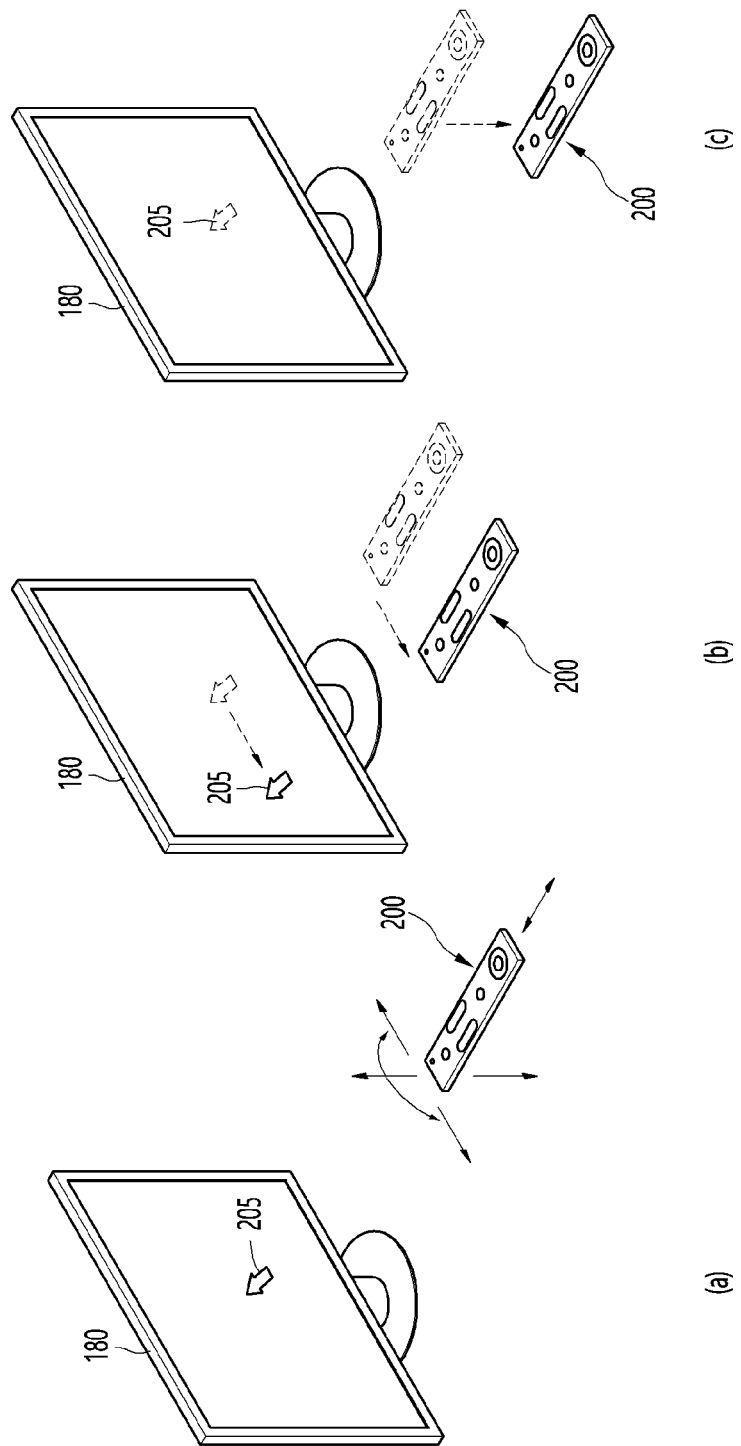
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4(*a*) illustrates that a pointer 205 corresponding to the remote control device 200 is displayed on the display 180.

In addition, a user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4(*b*) illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display 180. Thus, a selection area in the display 180 corresponding to the pointer 205 can be zoomed in and displayed largely.

If a user moves the remote control device 200 close to the display 180, a selection area in the display 180 corresponding to the pointer 205 can be zoomed out and displayed reduced.

If the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Further, the moving speed or moving direction of the pointer 205 can correspond to the moving speed or moving direction of the remote control device 200.

In addition, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Next, FIG. 5 is a cross-sectional view illustrating the inside of the housing of a display device according to an embodiment of the present disclosure.

The display device 100 may include a housing 183, a display 180 that is drawn into or drawn out of the housing 183, and a roller 184 that guides the display 180 to be wound or unwound.

The roller 184 may be accommodated in the housing 183.

The roller 184 may be a rotatable guide bar.

The roller 184 may be rotated such that the display 180 is wound or unwound.

For example, as shown in FIG. 5, when the roller 184 rotates in a R1 direction, the display 180 may be drawn out of the housing 183. On the other hand, when the roller 184 rotates in a R2 direction, the display 180 may be drawn into the housing 183 while being wound around the roller 184. In this way, the display 180 may be drawn out of or into the vertical direction.

In some embodiments, the display device 100 may be configured such that the display 180 is drawn out of or in the left and right directions.

The display 180 may be drawn out of the housing 183 or drawn into the housing 183 according to the rotation of the roller 184.

The controller 170 may control the display 180 so that content is displayed in an area drawn out of the housing 183 of the display 180.

In some embodiments, the display device 100 may further include a cover 186. The cover 186 may be disposed inside the housing 183 to protect the display 180 drawn into the housing 183.

In this way, as the display 180 is drawn out of or drawn into the housing 183, the area in which the content is displayed may increase or decrease. That is, the content display area of the display 180 may be changed as the display 180 is draw out or in.

Next, a draw-out length of the display 180 according to the display mode of the display device 100 will be described with reference to FIGS. 6 to 8.

Figure 6:
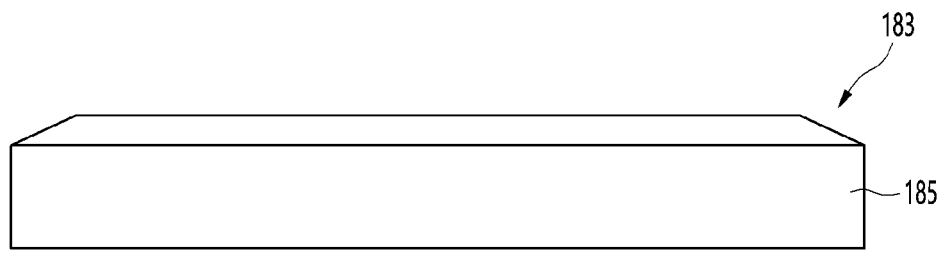
FIG. 6 is a view illustrating a shape of a display when the display mode according to an embodiment of the present disclosure is a zero view mode.
Figure 7:
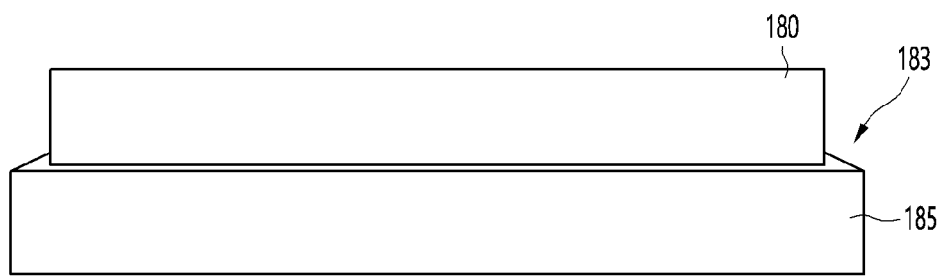
FIG. 7 is a view illustrating the shape of the display when the display mode according to the embodiment of the present disclosure is a partial view mode.
Figure 8:
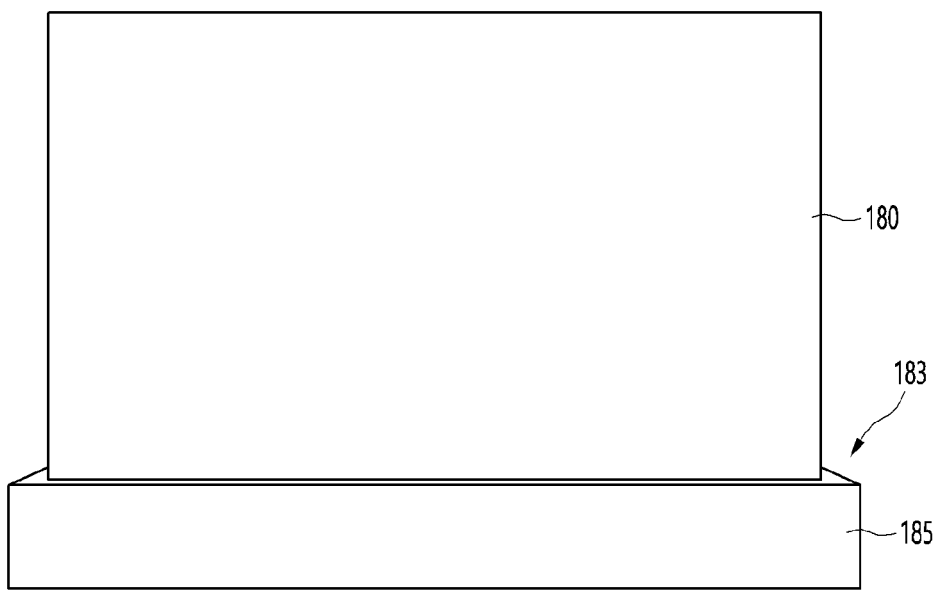
FIG. 8 is a view showing the shape of the display when the display mode according to an embodiment of the present disclosure is a full view mode.

FIG. 6 is a view illustrating a shape of a display when the display mode according to an embodiment of the present disclosure is a zero view mode, FIG. 7 is a view illustrating the shape of the display when the display mode according to the embodiment of the present disclosure is a partial view mode, and FIG. 8 is a view showing the shape of the display when the display mode according to an embodiment of the present disclosure is a full view mode.

Meanwhile, terms used in the present disclosure, for example, 'zero view mode', 'partial view mode', and 'full view mode' are only given as examples for convenience of description, and thus these terms may be changed. Therefore, it is reasonable to not be limited to the above term.

The zero view mode may be a mode in which the display 180 operates while totally being drawn into the housing 183. As shown in FIG. 6, in the zero view mode, the entire display 180 may be located inside the housing 183.

For example, when the display device 100 operates in a speaker mode, the display mode may be controlled to be the zero view mode. Also, when the display device 100 is powered off, the display 180 may be controlled to be in the zero view mode.

When the display 180 is in zero view mode, content may not be displayed in the entire area of the display 180. The display 180 may be turned off in the zero view mode.

The partial view mode may be a mode in which the display 180 operates in a state that a part thereof is drawn out of the housing 183. As shown in FIG. 7, in the partial view mode, a part of the display 180 may be located inside the housing 183, and the remaining part of the display 180 may be located outside the housing 183.

For example, when the display device 100 operates in a menu mode, a mood mode, a music mode, a frame mode, or a watch mode, the display mode may be controlled to be the partial view mode.

When the display 180 is in the partial view mode, content may be displayed only in an area drawn out of the housing 183 of the display 180. That is, in the partial view mode, content may not be displayed in an area drawn into the housing 183 of the display 180.

The full view mode may be a mode in which the display 180 operates in a state with the display is drawn out of the housing 183 to the maximum. That is, the full view mode may be a mode in which the draw-out length of the display 180 from the housing 183 is maximum. As shown in FIG. 8, in the full view mode, the display 180 may be totally drawn out of the housing 183.

For example, when the display device 100 operates in a normal mode, the display mode may be controlled to be the full-view mode, and in this case, the normal mode may be a mode in which a broadcast image, an input image from the external device interface unit 135, etc. are output.

When the display 180 is in the full view mode, content may be displayed in the area drawn out of the housing 183 of the display 180. In the full view mode, the display 180 may display content in the entire area of the display 180 in which image output is possible.

As described with reference to FIGS. 6 to 8, the display area of the content may vary according to the display mode, that is, the draw-out length of the display 180.

Meanwhile, the display device 100 according to the embodiment of the present disclosure may provide an alarm to a user.

The alarm may mean that the display device 100 notifies the user that the time set through the audio output unit 185, the light emission unit 177, the display 180, and the like has come.

For example, the controller 170 may output sound through the audio output unit 185, output light through the light emission unit 177, or display an image through the display 180 at the set time, thereby outputting the alarm notifying that the set time has come. Also, the controller 170 may output the alarm by outputting sound or an image received through an external device interworking with the display device 100 at the set time.

On the other hand, when the display 180 provided in the display device 100 according to the embodiment of the present disclosure is a rollable display, a problem may occur that an alarm cannot be output at an alarm time because it takes considerable time for the display 180 to be drawn out. For example, when an alarm is set to be output in the partial view mode or the full view mode but the display 180 is in the zero view mode at the alarm time, or an alarm is set to be output in the full view mode but the display 180 is in the zero view mode or the partial view mode at the alarm time, there may be a problem that alarm output is delayed while the display 180 is drawn out.

Accordingly, the display device 100 according to the embodiment of the present disclosure may control the roller 184 so that the display 180 is drawn out of the housing 183 before a predetermined time of the set alarm time, and output the alarm at the alarm time.

A method of operating the display device 100 according to an embodiment of the present disclosure will be described with reference to FIG. 9.

Figure 9:
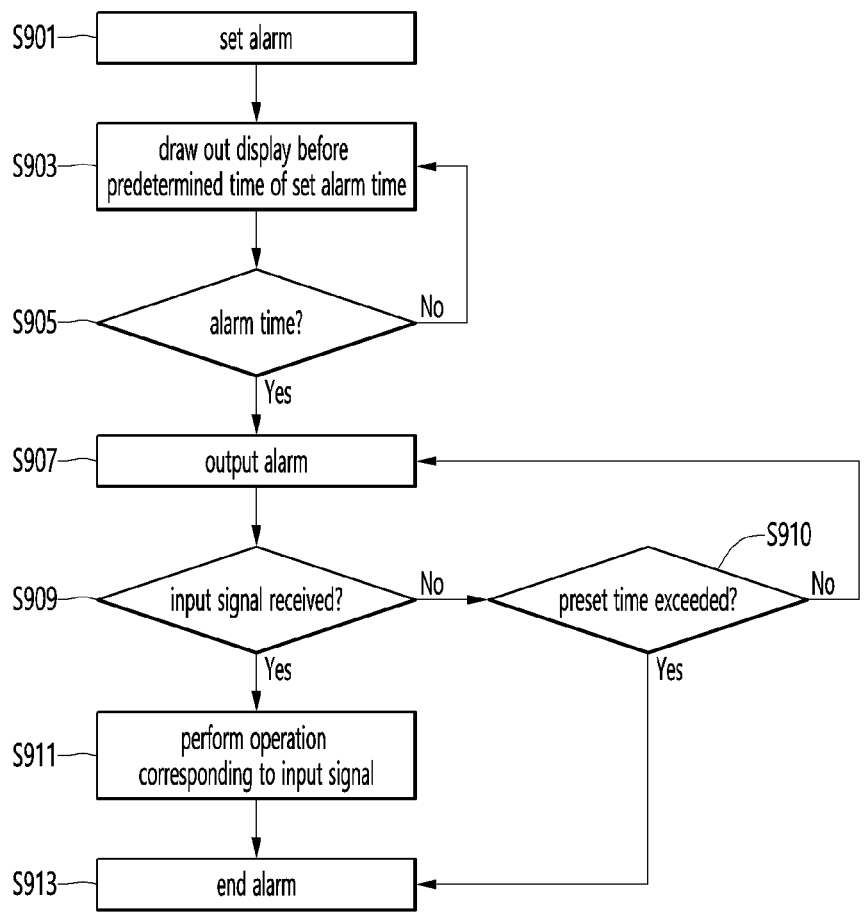
FIG. 9 is a flowchart illustrating a method of operating a display device according to an embodiment of the present disclosure.

FIG. 9 is a flowchart illustrating a method of operating a display device according to an embodiment of the present disclosure.

The controller 170 may set an alarm (S901).

A method of setting the alarm by the controller 170 may be various.

For example, the controller 170 may receive alarm setting information from an external device 500 (see FIG. 10) through the communication unit 173, and may set the alarm based on the received alarm setting information. Alternatively, the controller 170 may set the alarm by receiving alarm setting information input by the user through the user input interface unit 150.

The alarm setting information may mean information required for the display device 100 to output the alarm. For example, the alarm setting information includes at least one of an alarm setting time, an alarm output time, the number of times of outputting the alarm, an application to be provided when the alarm is output, or the draw-out length of the display 180 when outputting the alarm.

The controller 170 may set the alarm based on the alarm setting information, and draw out the display 180 before a predetermined time of the set alarm time (S903).

Here, the alarm time may be a time set to output the alarm.

The predetermined time may mean a preparation time required for the display device 100 to output the alarm.

The predetermined time may be preset as a default or may be set according to user input. The predetermined time may be several seconds to several minutes. For example, the predetermined time may be 10 seconds or 30 seconds, but this is only an example.

In some embodiments, the predetermined time may vary depending on the draw-out length of the display 180 to be drawn out when the alarm is output. For example, when the controller 170 is set to operate in the partial view mode when the alarm is output, the predetermined time is a first time, and, when the controller 170 is set to operate in the full view mode when the alarm is output, the predetermined time may be a second time greater than the first time.

For example, if the time required to change the display 180 from the zero view mode to the partial view mode is 2 seconds, the current mode is a zero view mode, and the alarm is set to be output in the partial view mode, the predetermined time may be 2 seconds. In addition, when the time required to change the display from the zero-view mode to the full-view mode is 5 seconds, the current mode is a zero-view mode, and the alarm is set to be output in the full-view mode, the predetermined time may be 5 seconds.

Therefore, when the alarm time is 8:40:00 AM, the controller 170 may control the roller 184 to start drawing out the display 180 at 8:39:58 AM, 2 seconds before the alarm time, and the controller 170 may control the roller 184 to start drawing out the display 180 at 8:39:55 AM, 5 seconds before the alarm time.

On the other hand, in the case where the display device 100 is only powered on without drawing out the display 180 in order to output the set alarm, the predetermined time may be the time required to power on the display device 100.

As such, when the display 180 is drawn out in advance before a predetermined time, there is an advantage that the time required for the display device 100 to prepare alarm output can be secured in advance.

Next, a method for the controller 170 to set an alarm based on the alarm setting information and to start drawing out the display 180 in advance before a predetermined time of the set alarm time will be described with reference to FIG. 10.

Figure 10:
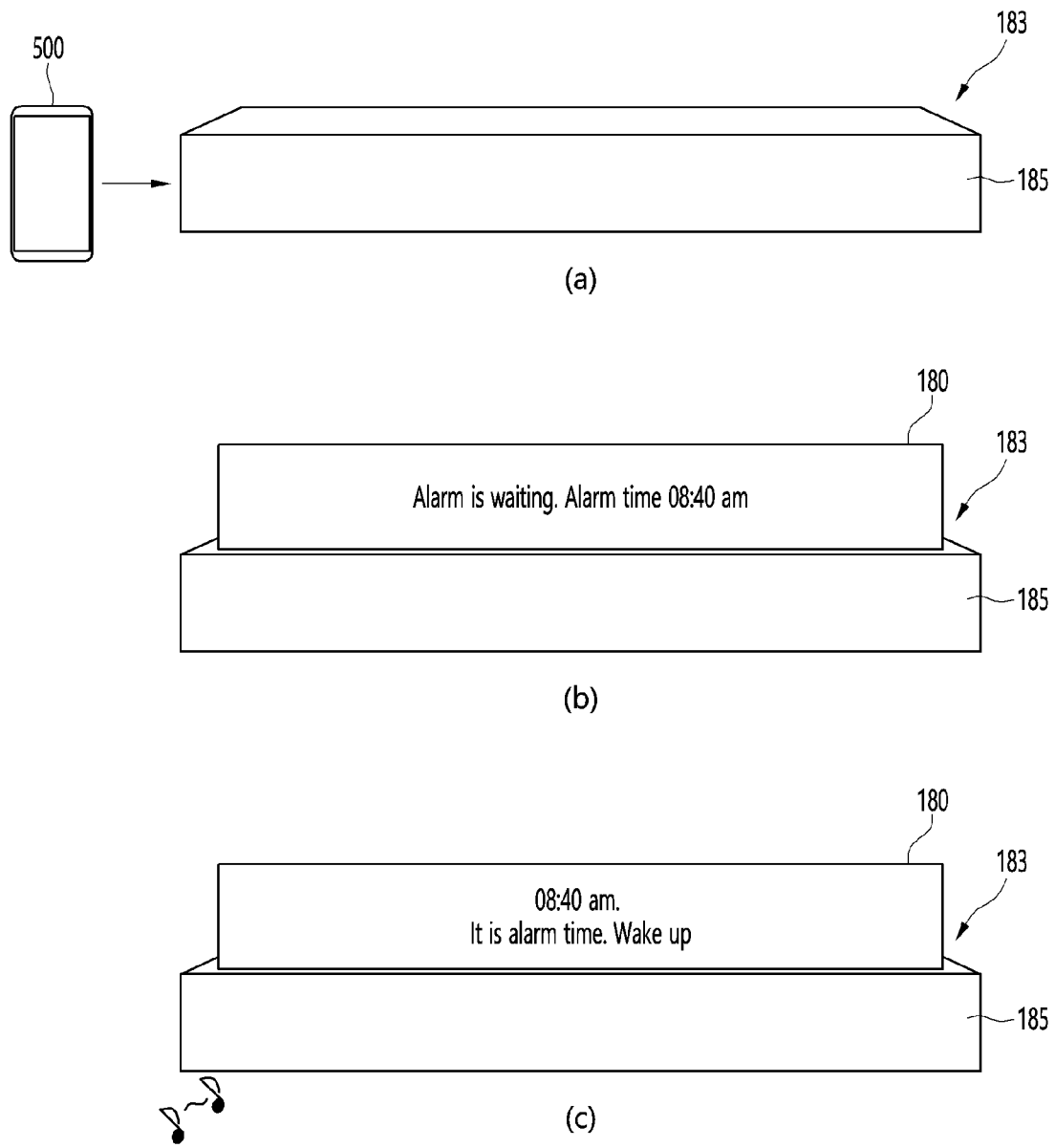
FIG. 10 is a diagram illustrating a method for a display device to draw out a display before a predetermined time of a set alarm time according to an embodiment of the present disclosure.

FIG. 10 is a diagram illustrating a method for a display device to draw out a display before a predetermined time of a set alarm time according to an embodiment of the present disclosure.

As shown in (a) of FIG. 10, the controller 170 may set an alarm based on alarm setting information received from the external device 500. For example, the controller 170 may set the alarm so that the display 180 operates in the partial view mode when an alarm time is 08:40 and the alarm is output.

Then, the controller 170 may control the roller 184 to start drawing out the display 180 in advance before a predetermined time of the set alarm time, as shown in (b) of FIG. 10. At this time, the controller 170 may display a screen showing that the alarm is waiting along with the set alarm time on the drawn-out display 180. That is, the controller 170 may display the alarm setting information on the display 180 until the alarm time after the display 180 is drawn out.

(c) of FIG. 10 may be a shape of the display device 100 at the alarm time. The controller 170 may output the alarm at the set alarm time as shown in (c) of FIG. 10. The controller 170 may output the alarm by displaying alarm content on the display 180 drawn out in advance at the alarm time. Here, the alarm content is information set by the user to be displayed on the display 180 when the alarm is output, and may include, for example, an alarm title.

On the other hand, the controller 170 may differently adjust the draw-out length of the display 180 according to the alarm setting information.

For example, the alarm setting information may be an application set to be displayed when an alarm is output, an image preset to be displayed when an alarm is output, and the like.

First, in the case of an application in which alarm setting information is set to be displayed when an alarm is output, a method for the controller 170 to differently adjust the draw-out length of the display 180 will be described.

The controller 170 may differently adjust the draw-out length of the display 180 in advance according to the type of application set to be displayed on the display 180 when the alarm is output.

According to an embodiment of the present disclosure, when the application set to be displayed when the display device 100 outputs an alarm varies, the draw-out length of the display 180 required when outputting the alarm may also vary.

For example, when the set application is an application that reproduces only sound, the draw-out length of the display 180 required when the alarm is output may be 0. In this case, the controller 170 may control the display 180 to be in the zero view mode before the alarm is output. In addition, if the set application is an application that displays only a static image or text, the draw-out length of the display 180 required when the alarm is output may be a first length (L1), and, in this case, the controller 170 may control the display 180 to be in the partial view mode before the alarm is output. In addition, when the set application is an application that displays a dynamic video or image, the draw-out length of the display 180 required when the alarm is output may be a second length L2 longer than the first length L1, and, in this case, the controller 170 may control the display 180 to be in the full view mode before alarm output. It was assumed that the draw-out length of the display 180 is controlled to be the first length L1 in the partial view mode and the draw-out length of the display 180 is controlled to be the second length L2 in the full view mode, but this is only an example and thus is not limited thereto.

Next, a method for the display device 100 to adjust the draw-out length of the display 180 according to the set application according to an embodiment of the present disclosure will be described with reference to FIG. 11.

FIG. 11 is a diagram illustrating a method for the display device to adjust a draw-out length of a display according to a set application according to an embodiment of the present disclosure.

When the set application is an application that displays only a static image or text, that is, when the draw-out length of the display 180 required when the alarm is output is the first length (L1), the controller 170 may control the roller 184 so that the display 180 starts to be drawn out before a predetermined time of the alarm time and is drawn out by the first length L1 as shown in (a) of FIG. 11.

In addition, when the set application is an application that displays a dynamic video or image, that is, when the draw-out length of the display 180 required when the alarm is output is the second length (L2), the controller 170 may control the roller 184 so that the display 180 starts to be drawn out before the predetermined time of the alarm time and is drawn out by the second length L2 longer than the first length L1 as shown in (b) of FIG. 11.

At this time, the draw-out length is not fixed according to the set application, and the first length and the second length are only examples.

According to this embodiment, it is possible to complete a necessary operation in response to various alarm setting information in advance, and thus there is an advantage that the alarm can be output immediately at an alarm time. For example, in outputting alarms having different preparation times or draw-out lengths required to output an alarm, there is an advantage that it is possible to provide the display device 100 which completes all necessary preparation operations immediately before outputting the alarm.

Next, a method for the controller 170 to differently adjust the draw-out length of the display 180 when the alarm setting information is an image preset to be displayed when the alarm is output will be described.

According to an embodiment of the present disclosure, before outputting the alarm, the controller 170 may control the display 180 so that a preset image is displayed on the display 180 while the display 180 is drawn out. The preset image may be an image preset to be displayed while the display 180 is drawn out before the alarm is output. For example, the preset image may be a sun image representing a scene in which the sun rises, a moon image representing a scene in which the moon rises, and the like, but this is merely an example and thus is not limited thereto.

A method for the display device to display a preset image on the display 180 while the display 180 is drawn out according to an embodiment of the present disclosure will be described with reference to FIGS. 12 to 13.

FIGS. 12 and 13 are views illustrating a method for a display device to display a preset image while a display is drawn out according to an embodiment of the present disclosure.

According to the first embodiment, as shown in (a) of FIG. 12 or (a) of FIG. 13, the display device 100 may control the roller 184 so that the display 180 is drawn out in the partial view mode before a predetermined time from the alarm time. The controller 170 may display a preset image, such as a sun image or a moon image, on the display 180 drawn out in the partial view mode.

Thereafter, when the alarm time comes, the controller 170 may control the display 180 to change the position of the sun or the moon while maintaining the partial view mode. Alternatively, when the alarm time comes, the controller 170 may control the display 180 to change the position of the sun or the moon while changing the partial view mode to the full view mode as shown in (b) of FIG. 12 or (b) of FIG. 13. In this case, the controller 170 may change the position of the sun or the position of the moon based on the current time.

Through this, the display device 100 may express a scene in which the sun rises or a scene in which the moon rises while the display 180 is drawn out. That is, the controller 170 may control the display 180 so that the image is changed and displayed as the sun or moon rises upward as the display 180 is drawn out.

That is, the display device 100 may produce a scene in which the sun rises as shown in FIG. 12. (a) to (b) of FIG. 12 show a state in which the display 180 is additionally drawn out as the alarm time comes, and a scene in which the sun rises over the mountain as the display 180 is additionally drawn out.

In addition, the display device 100 may produce a scene in which the moon rises as shown in FIG. 13. At this time, (a) to (b) of FIG. 13 show a state in which the display 180 is additionally drawn out as the alarm time comes, and the moon rises over the mountain as the display 180 is additionally drawn out.

Also, according to an embodiment of the present disclosure, a preset image may vary according to a set alarm time. For example, the controller 170 may control the display 180 to display the sun image as shown in FIG. 12 when the set alarm time is a morning time, and to display the moon image as shown in FIG. 13 when the set alarm time is an afternoon time.

In addition, the controller 170 may receive the sunrise time of the day, set the received sunrise time of the day as an alarm, draw out the display 180 at the set alarm time, and display a sunrise image.

According to the second embodiment, the display device 100 may draw out the display 180, display a preset image, and simultaneously adjust the brightness. The controller 170 may also control the brightness of the display 180 to gradually increase while the display 180 is being drawn out.

For example, the controller 170 may perform control to display a preset image as the draw-out length of the display 180 increases from the zero view mode to the partial view mode, and to, at the same time, gradually increase the brightness of the display 180 from 0% to 50% of the brightness set by the user. As a specific example, the controller 170 may gradually increase the brightness of the display 180 so that the brightness of the display 180 is 0% of the brightness set by the user in the zero view mode and the brightness of the display 180 is 50% of the brightness set by the user in the partial view mode. In addition, the controller 170 may control the display 180 so that the brightness of the display 180 is the brightness set by the user at the alarm output time.

As another example, while the display 180 is being drawn out, the controller 170 may control the brightness to be first brightness if the draw-out length is the first length, and control the brightness to be second brightness brighter than the first bright if the pull-out length is a second length longer than the first length. Conversely, while the display 180 is being drawn out, the controller 170 may control the brightness to be a first brightness if the draw-out length is the first length, and control the brightness to be a second brightness that is darker than the first brightness if the draw-out length is the second length longer than the first length.

As another example, the display device 100 may draw out the display 180, display a preset image, and simultaneously adjust the brightness according to the current time. The controller 170 may control the display 180 so that the brightness of the display 180 varies according to the current time. That is, the controller 170 may control the brightness of the display 180 to increase as the current time approaches the alarm time while the display 180 is drawn out. Also, the controller 170 may control the brightness of the display 180 to decrease as the current time approaches the alarm time as the display 180 is drawn out.

According to these embodiments, an emotional effect can be given to the user by utilizing the time when the display 180 is drawn out, and an alarm can be output when the sun rises at the sunrise time even when the user does not directly set the alarm, thereby increasing the effect of the alarm.

Referring to FIG. 9 again, when the set alarm time comes (S905), the controller 170 may output the alarm (S907). At this time, the method of outputting the alarm by the display device 100 may be various.

A method of outputting the alarm by the display device 100 may vary depending on alarm setting information.

For example, the display device 100 may output the alarm differently depending on an application to be provided when outputting an alarm, which is one of alarm setting information.

As another example, when outputting an alarm, which is one of alarm setting information, the controller 170 may output the alarm in a different way according to the draw-out length of the display 180.

For example, if an alarm is set to be output when the draw-out length of the display 180 is 0, the controller 170 may output an alarm sound at an alarm time without drawing out the display 180. In this case, the alarm sound may mean a sound notifying an alarm time. For example, the alarm sound may include at least one of an alarm clock sound, a musical instrument playing sound, music received from an external device, a news sound, an AI voice, or a weather guide sound.

When an alarm is set to be output when the draw-out length of the display 180 is the first length L1, the controller 170 may display an alarm summary image and the like on the display 180. In this case, the alarm summary image may mean an image summarizing the content indicating the alarm time. For example, the alarm summary image may include at least one of an alarm setting information summary image, a music information summary image received from an external device, a news summary image, and a weather summary image.

When an alarm is set to be output when the draw-out length of the display 180 is the second length L2 longer than the first length L1, the controller 170 may display an alarm image, etc. on the display 180. In this case, the alarm image may mean an image showing an alarm time. For example, the alarm image may include at least one of an alarm setting information image, a music video image of music received from an external device, a music list image similar to music received from the external device, a news image, or a weather image.

The first length L1 may be the draw-out length of the display 180 in the partial view mode, and the second length L2 may be the draw-out length of the display 180 in the full view mode, but this is only an example.

Next, various methods of outputting an alarm according to the draw-out length of the display 180 when the display device 100 outputs the alarm will be described with reference to FIGS. 14 to 15.

Figure 14:
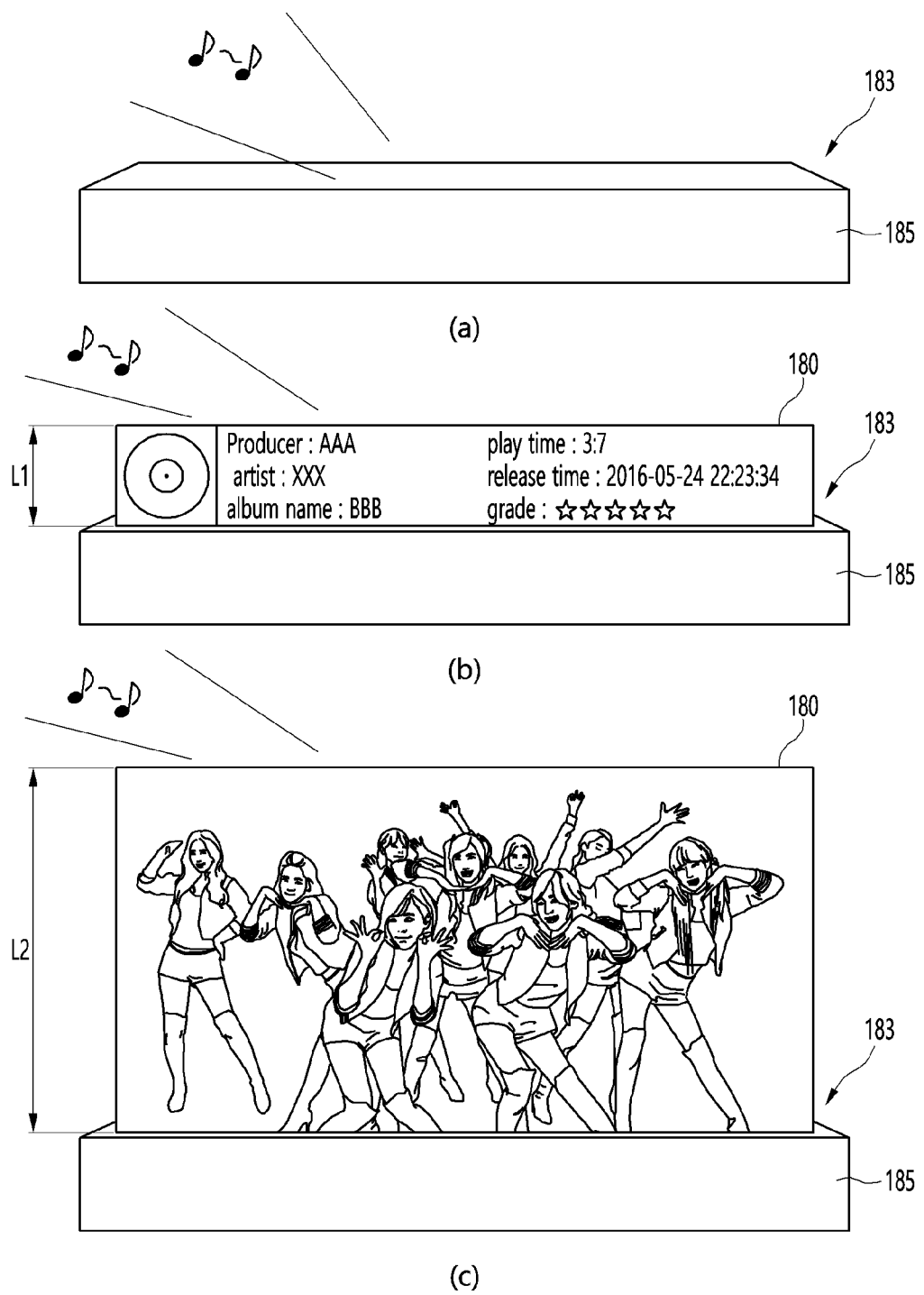
FIGS. 14 to 15 are diagrams illustrating a method of differently outputting an alarm according to a draw-out length of a display by a display device according to an embodiment of the present disclosure.
Figure 15:
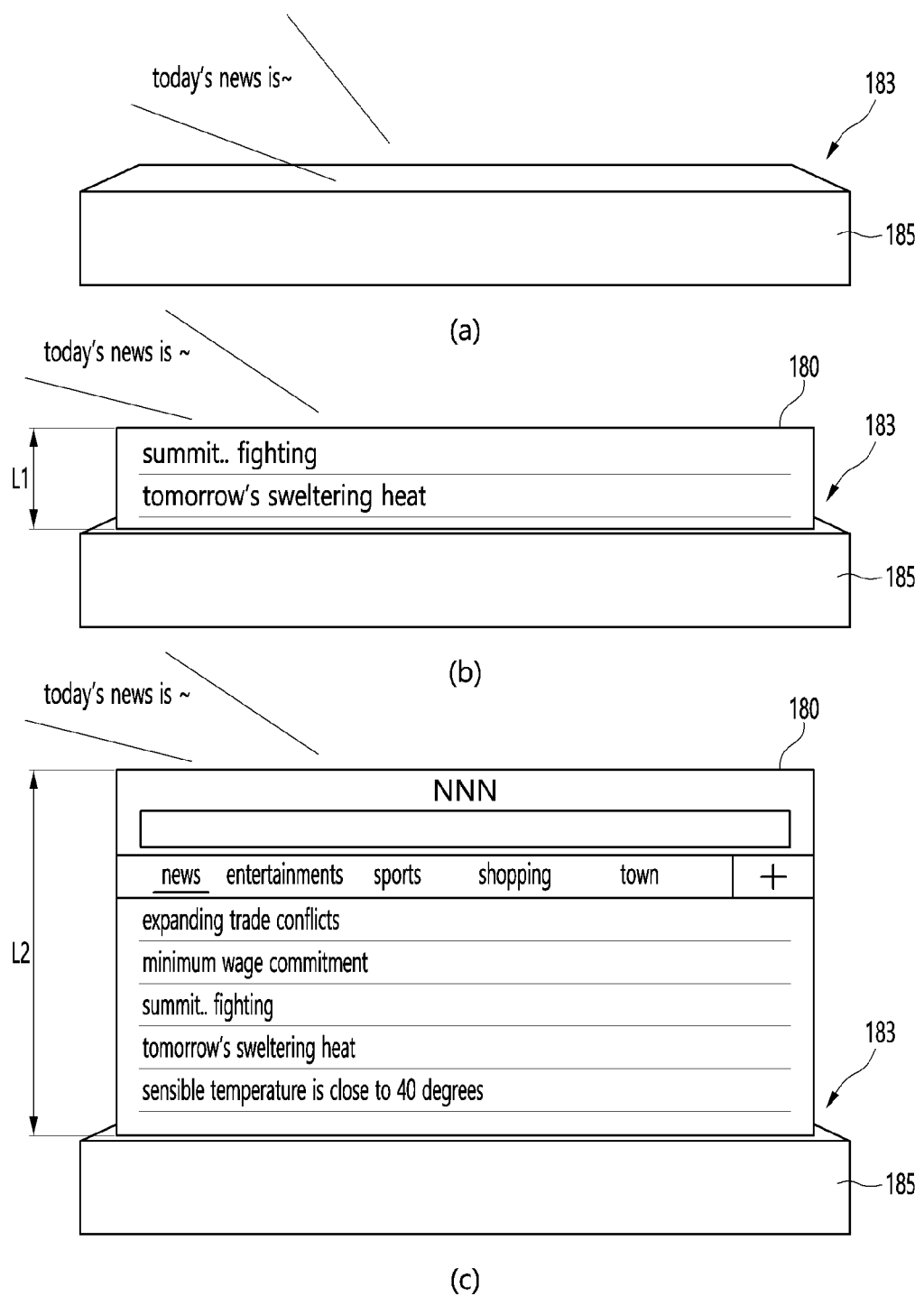

FIGS. 14 to 15 are diagrams illustrating a method of differently outputting an alarm according to a draw-out length of a display by a display device according to an embodiment of the present disclosure.

For example, if an alarm is set to be output when the draw-out length of the display 180 is 0 as shown in (a) of FIG. 14, the controller 170 may output music received from the external device at the alarm time without drawing out the display 180. In addition, when an alarm is set to be output when the draw-out length of the display 180 is the first length L1 as shown in (b) of FIG. 14, the controller 170 may display an image summarizing information on music received from the external device on the display 180 as an alarm summary image. In addition, when an alarm is set to be output when the draw-out length of the display 180 is the second length (L2) longer than the first length (L1) as shown in (c) of FIG. 14, the controller 170 may display a music video image of music received from an external device on the display 180 as an entire alarm image.

As another embodiment, when an alarm is set to be output when the draw-out length of the display 180 is 0 as shown in (a) of FIG. 15, the controller 170 may output news sound at the alarm time without draw-out. On the other hand, when an alarm is set to be output when the draw-out length of the display 180 is the first length L1 as shown in (b) of FIG. 15, the controller 170 may display the news summary image as the alarm summary image on the display 180. In addition, when an alarm is set to be output when the draw-out length of the display 180 is the second length L2 longer than the first length L1 as shown in (c) of FIG. 15, the controller 170 may display the news image on the display 180 as the alarm image.

That is, the content displayed on the display 180 or the form thereof may vary according to the draw-out length of the display 180.

Meanwhile, in some cases, the alarm setting information may not include the draw-out length of the display 180 when the alarm is output. In this case, according to an embodiment, the controller 170 may set the draw-out length of the display 180 when the alarm is set in S901 to the draw-out length of the display 180 when the alarm is output. For example, the controller 170 may set the draw-out length of the display 180 to the zero view mode when the alarm is output if the draw-out length of the display 180 is the zero view mode when the alarm is set in S901, and may set the draw-out length of the display 180 to the full view mode when the alarm is output if the draw-out length of the display 180 is the full view mode when the alarm is set in S901.

According to these embodiments, the display device 100 may differently control the content or form of information according to the draw-out length of the display 180 when the alarm is output, thereby providing information currently providable in the mode of the display 180 to the user to the maximum.

Returning to FIG. 9, when an input signal is received while outputting the alarm (S909), the controller 170 may perform operation corresponding to the input signal (S911).

The input signal may mean a signal detected from the outside to stop or end the alarm.

For example, the input signal may include at least one of a signal for temporarily stopping an alarm, a signal for ending an alarm, or a user detection signal.

First, a method of performing operation corresponding to the user detection signal by the controller 170 when the user detection signal is received will be described.

The user detection signal may be a signal generated when the motion recognition sensor 175 detects that the user appears in front of the display 180.

According to an embodiment of the present disclosure, when the user is detected through the motion recognition sensor 175 while outputting the alarm, the controller 170 may recognize that the user wakes up by the alarm and perform operation corresponding to the user detection signal.

The operation corresponding to the user detection signal may mean operation of displaying a preset screen in a state in which the display 180 is drawn out by a maximum length. For example, the preset screen may be an alarm image or a mirroring image, but this is only an example.

For example, when the user is detected through the motion recognition sensor 175 while outputting the alarm, the controller 170 may draw out the display 180 to the maximum length, and display the mirroring screen of the external device 500 interworking with the display device 100 on the display 180.

Next, a method of operating the display device 100 when a user is detected while the display device 100 outputs an alarm according to an embodiment of the present disclosure will be described with reference to FIGS. 16 to 17.

FIG. 16 is a diagram illustrating an example of an operation method when a user is detected while a display device outputs an alarm according to an embodiment of the present disclosure.

For example, if the user appears in front of the display device 100 while outputting the alarm sound in a state in which the display 180 is drawn out by the first length L1 at the set alarm time as shown in (a) of FIG. 16, the controller 170 may detect the user through the motion recognition sensor 175. In this case, the controller 170 may display the alarm image while adjusting the draw-out length to the second length L2 longer than the first length L1 as shown in (b) of FIG. 16.

FIG. 17 is a diagram illustrating another example of an operation method when a user is detected while a display device outputs an alarm according to an embodiment of the present disclosure.

For example, when the user appears in front of the display device 100 while the alarm is output at the set alarm time in (a) of FIG. 17, the controller 170 may detect the user through the motion recognition sensor 175. In this case, the controller 170 may display a mirroring screen of the external device 500 interworking with the display device 100 on the display 180 as shown in (b) of FIG. 17. In this case, the controller 170 may adjust the draw-out length of the display 180 as needed.

Meanwhile, the preset screen may be set in various ways for each user. For example, the controller 170 may draw out the display 180 to the maximum length and display a first screen set by a first user when a user detection signal for detecting the first user is received, and may draw out the display 180 to the maximum length and display a second screen set by a second user when a user detection signal for detecting the user is received.

According to this embodiment, it is possible to provide the display device 100 capable of detecting that the user wakes up and supporting user convenience by using a function interworking with an alarm function.

Next, a method of performing operation corresponding to an input signal for temporally stopping the alarm by the controller 170 when the input signal for temporarily stopping the alarm is received will be described.

According to another embodiment of the present disclosure, the controller 170 may receive the input signal for temporarily stopping the alarm.

The input signal for temporarily stopping the alarm may refer to an input signal for setting the alarm so that the alarm is output again after a reference time, not a signal for ending the alarm. The input signal for temporarily stopping the alarm may be a snooze signal. In this case, the reference time may be preset as a default or may be set according to user input. The reference time may be several seconds to several minutes. For example, the reference time may be 3 minutes or 5 minutes, but this is only an example.

For example, if the reference time is 3 minutes when the alarm is output at 8:40 am, which is the set alarm time, when the signal for temporarily stopping the alarm is received, the controller 170 may output the alarm at 8:43 am, 3 minutes after the set alarm time. Alternatively, if the user temporarily stops the alarm while setting the reference time to 5 minutes when the alarm is output, the controller 170 may output the alarm again at 8:45 am, 5 minutes after the set alarm time.

Also, the controller 170 may receive the input signal for temporarily stopping the alarm through the external device 500 interworking with the display device 100. For example, if the user pushes a clock picture to the left on an icon 517 (see FIG. 19) for ending or temporarily stopping the alarm displayed on the screen of the external device 500 interworking with the display device 100, the controller 170 may recognize that the input signal for temporarily stopping the alarm has been received.

Next, a method of operating the display device 100 when the display device 100 receives an input signal for temporarily stopping an alarm according to an embodiment of the present disclosure will be described with reference to FIG. 18.

FIG. 18 is a diagram illustrating a method of operating the display device when the display device receives an input signal for temporarily stopping an alarm.

For example, when the controller 170 receives the input signal for temporarily stopping the alarm while an alarm is being output at 08:40 am, the alarm time, as shown in (a) of FIG. 18, the controller 170 may show that the set alarm is being stopped as shown in (b) of FIG. 18. The controller 170 may set the alarm so that the alarm is output again at 08:45 am, 5 minutes later.

Also, the controller 170 may adjust the brightness of the display 180 upon receiving the input signal for temporarily stopping the alarm. For example, the controller 170 may adjust the brightness of the display 180 after receiving the input signal for temporarily stopping the alarm to be darker than the brightness of the display 180 before receiving the input signal for temporarily stopping the alarm. Thereafter, the controller 170 may output the alarm again when the reference time has elapsed, and control the brightness to be the same as the brightness before receiving the input signal for temporarily stopping the alarm when outputting the alarm again.

Also, the controller 170 may turn off the power of the display device 100 when the number of times of receiving the input signal for temporarily stopping the alarm exceeds a preset number of times. This is because it may be necessary to limit the number of repetitions of temporarily stopping the alarm and outputting it again.

According to this embodiment, it is possible to additionally output an alarm in addition to the set alarm, and it is possible to reduce the time required for the display device 100 to prepare for the alarm output again. In addition, there is an effect of reducing unnecessary power consumption by dimming the brightness of the display 180 while the alarm is temporarily stopped.

And, the controller 170 may end alarm output when receiving a signal for ending the alarm as an input signal, which will be described in detail in step S913.

Meanwhile, according to an embodiment of the present disclosure, the controller 170 may receive a signal for ending the alarm from the external device 500.

For example, when outputting an alarm at an alarm time, the controller 170 may transmit, to the external device 500, a signal for granting authority to remotely control the display device 100.

The external device 500 may display interworking information on the screen 510 of the external device, when receiving a signal for granting authority to remotely control the display device 100 from the display device 100.

The interworking information may refer to information shared between the external device 500 and the display device 100.

For example, the interworking information may include at least one of information 511 on the alarm currently being displayed through the display 180, application information 513, display mode 515, or alarm stop/end information 517.

A method of transmitting a signal for granting authority to remotely control the display device 100 to the external device 500 when the display device 100 outputs an alarm at an alarm time according to an embodiment of the present disclosure will be described with reference to FIG. 19.

Figure 19:
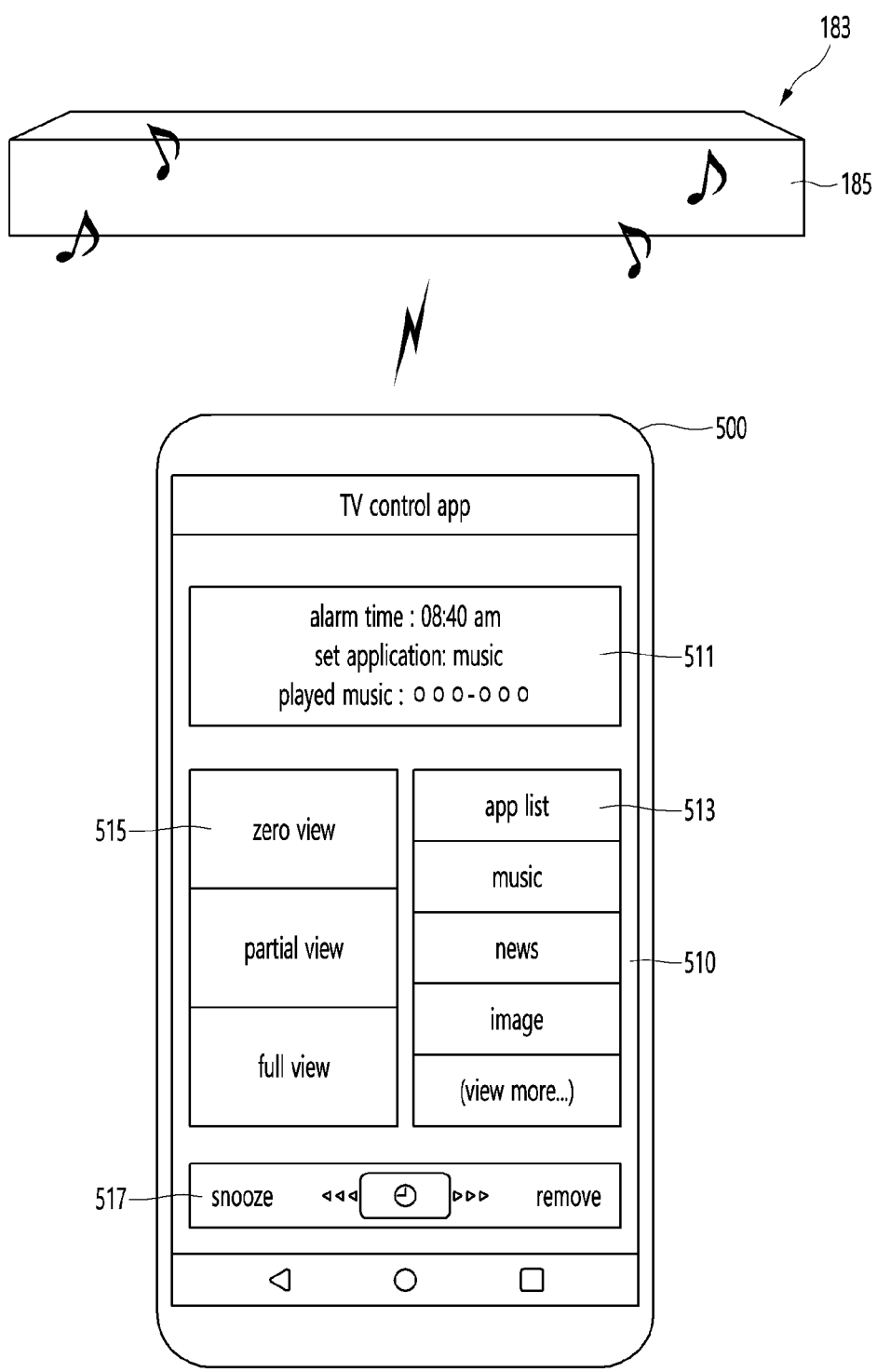
FIG. 19 is a diagram illustrating an example in which the display device transmits a signal for granting authority to remotely control the display device to an external device according to an embodiment of the present disclosure.

FIG. 19 is a diagram illustrating an example in which the display device transmits a signal for granting authority to remotely control the display device to an external device according to an embodiment of the present disclosure.

When any one of the interworking information is selected, the external device 500 may transmit, to the display device 100, a remote control signal for enabling the display device 100 to perform operation according to the selected information.

The controller 170 may change an application being currently executed in response to the received selection signal, when receiving the remote control signal from the external device 500 according to selection of any one of the application information 513. The controller 170 may change the draw-out length of the display 180 in response to the received selection signal, when receiving, from the external device 500, the remote control signal according to selection of one of the display modes 515. The controller 170 may stop or end the alarm in response to the received selection signal, when receiving the remote control signal according to selection of any one of the alarm stop/end information 517.

Also, when any one of the information 511 on the alarm currently displayed through the display 180 is changed, the external device 500 may display the changed alarm information on the external device screen 510.

Accordingly, there is an advantage that the user can more easily check information for manipulating the display device 100 through the external device 500 when the alarm is output. In addition, even if an alarm is output from the display device 100, there is an advantage that the alarm output from the display device 100 can be more easily controlled through the external device 500.

Returning to FIG. 9, the controller 170 may determine whether a preset time has been exceeded from the output time of the alarm (S910) when there is no reception of the input signal, and may end the alarm (S913) when the preset time has been exceeded.

Also, the controller 170 may end the alarm even when receiving an input signal for ending the alarm (S913).

That is, if there is no input signal during a preset time from the output time of the alarm, the controller 170 may end the alarm.

Accordingly, when there is no input signal during a preset time from the output time of the alarm, the controller 170 may control the roller 184 so that the display 180 is drawn into the housing 183. When there is no input signal during a preset time from the alarm output time, the controller 170 may control the display 180 to be in the zero view mode.

The preset time may be preset as a default or may be set according to user input. The preset time may be several seconds to several minutes. For example, the preset time may be 1 minute or 3 minutes, but this is only an example.

That is, the display device 100 according to an embodiment of the present disclosure may end the alarm and draw the display 180 into the housing when there is no input signal during the preset time after the alarm is output.

According to this embodiment, even when there is no user who may end the alarm output of the display device 100, the display device 100 may end the alarm by itself, thereby preventing unnecessary power consumption.

On the other hand, when an input signal is not received but the preset time has not been exceeded from the alarm output time, the controller 170 may continue to output the alarm (S907).

Each of the embodiments disclosed herein may be practiced alone, or may be practiced in combination with other embodiments.

The above description is merely illustrative of the technical spirit of the present disclosure, and various modifications and variations will be possible by those of ordinary skill in the art to which the present disclosure pertains without departing from the essential characteristics of the present disclosure.

Accordingly, the embodiments disclosed in the present disclosure are for explanation rather than limiting the technical spirit of the present disclosure, and the scope of the technical spirit of the present disclosure is not limited by these embodiments.

The protection scope of the present disclosure should be construed by the following claims, and all technical ideas within the scope equivalent thereto should be construed as being included in the scope of the present disclosure.

The invention claimed is:

1. A display device comprising:
   a housing;
   a display;
   a roller accommodated in the housing to rotate to wind or unwind the display; and
   a controller configured to control the roller to start a drawing out of the display from the housing at a first time point and control the display to output an alarm at a second time point,
   wherein the second time point is a time point set to output the alarm,
   wherein the first time point precedes the second time point by a predetermined time period, and
   wherein the predetermined time period is equal to a time period required to complete the drawing out of the display and facilitate outputting the alarm in full by the display.

2. The display device of claim 1, wherein the controller is further configured to differently adjust a draw-out length of the display according to alarm setting information.

3. The display device of claim 1, wherein the controller is further configured to control the roller such that the display is drawn out of the housing by a preset length.

4. The display device of claim 3, wherein the preset length varies according to a type of an application which is set to be displayed at the display when the alarm is output.

5. The display device of claim 1, wherein the controller is further configured to differently output the alarm according to a draw-out length of the display when the alarm is output.

6. The display device of claim 1, wherein the controller is further configured to draw out the display by a maximum length based on a user being detected while the alarm is output.

7. The display device of claim 1, wherein the controller is further configured to display, at the display, a mirroring screen of an external device interworking with the display device based on a user being detected while the alarm is output.

8. The display device of claim 1, wherein the controller is further configured to output audio or an image received through an external device interworking with the display device when the alarm is output.

9. The display device of claim 1, wherein the controller is further configured to control the display such that a preset image is displayed at the display while the display is drawn out.

10. The display device of claim 9, wherein the preset image varies according to the second time point.

11. The display device of claim 9, wherein the controller is further configured to perform control to gradually increase a brightness of the display while the display is drawn out.

12. The display device of claim 9, wherein the controller is further configured to control the display such that a brightness of the display varies according to a current time.

13. The display device of claim 1, wherein the controller is further configured to set the alarm to be output again after a reference time has passed, based on an input signal for temporarily stopping the alarm being received.

14. The display device of claim 13, wherein the controller is further configured to turn off power of the display device when a number of times that the input signal for temporarily stopping the alarm is received exceeds a preset number.

15. The display device of claim 1, wherein the controller is further configured to adjust a brightness of the display based on an input signal for temporarily stopping the alarm being received.

16. The display device of claim 15, wherein the controller is further configured to, after the input signal for temporarily stopping the alarm is received, adjust the brightness of the display to be darker than before the input signal is received.

17. The display device of claim 1, wherein the controller is further configured to transmit, to an external device, a signal for granting authority to remotely control the display device when the alarm is output at the second time point.

18. The display device of claim 1, wherein the controller is further configured to end output of the alarm based on no input signal being received during a preset time after an output time of the alarm.

19. The display device of claim 1, wherein the controller is further configured to control the roller to draw the display into the housing based on no input signal being received during a preset time after the second time point.

20. The display device of claim 1, wherein the controller is further configured to set the alarm based on a signal received from an external device or user input that is received.

\* \* \* \* \*